(12) United States Patent
Eng

(10) Patent No.: US 8,245,979 B2
(45) Date of Patent: Aug. 21, 2012

(54) CENTRALIZED BUS INTERFACE WITH SINGLE WIRE SECONDARY DISTRIBUTION

(75) Inventor: John E. Eng, Buena Park, CA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 12/333,978

(22) Filed: Dec. 12, 2008

(65) Prior Publication Data

US 2009/0094398 A1     Apr. 9, 2009

Related U.S. Application Data

(62) Division of application No. 10/666,664, filed on Sep. 17, 2003, now Pat. No. 7,484,693.

(51) Int. Cl.
*B64G 1/00* (2006.01)

(52) U.S. Cl. .......... 244/158.1; 244/75.1; 244/129.1; 244/227; 340/870.19; 340/870.24; 340/538; 340/855.8

(58) Field of Classification Search .......... 340/855.8, 340/855.2, 855.1, 854.9, 870.19, 870.24, 340/538; 244/158.1, 75.1, 129.1, 227
See application file for complete search history.

(56) References Cited

U.S. PATENT DOCUMENTS

| | | | | |
|---|---|---|---|---|
| 4,026,215 A | * | 5/1977 | Ziemba et al. | 102/206 |
| 4,804,938 A | * | 2/1989 | Rouse et al. | 370/276 |
| 4,876,539 A | * | 10/1989 | Farque | 340/855.9 |
| 5,172,717 A | * | 12/1992 | Boyle et al. | 137/155 |
| 5,613,653 A | | 3/1997 | Bombled et al. | |
| 7,027,483 B2 | | 4/2006 | Santhoff et al. | |
| 7,036,773 B2 | | 5/2006 | Caldwell | |

OTHER PUBLICATIONS

Pulse Width Modulation (PWM) Tutorial by Datadog Systems, 2005, datadog.com/pwm_tutorial.pdf.*

* cited by examiner

*Primary Examiner* — J. Woodrow Eldred
(74) *Attorney, Agent, or Firm* — Klintworth & Rozenblat IP LLC

(57) ABSTRACT

A system for single wire secondary distribution comprising a spacecraft platform; a central bus interface unit coupled to the spacecraft platform; a payload unit coupled to the central bus interface unit; and a centralized power supply for powering the central bus interface unit and the payload unit; wherein the spacecraft platform provides a command to the central bus interface unit; wherein the central bus interface unit interrupts the power to the payload unit in a manner corresponding to the commands received by the central bus interface unit; wherein the payload unit decodes the interruption to the power and executes the command from the spacecraft platform.

21 Claims, 4 Drawing Sheets

CENTRALIZED BUS INTERFACE WITH SINGLE WIRE SECONDARY DISTRIBUTION

CROSS REFERENCE TO RELATED APPLICATION

This application is a divisional application of U.S. application Ser. No. 10/666,664, filed Sep. 17, 2003 now U.S. Pat. No. 7,484,693.

BACKGROUND OF INVENTION

1. Field of the Invention

The present invention relates generally to the transfer of data. More specifically, but without limitation thereto, the present invention relates to a centralized bus interface for connecting a payload unit and a spacecraft bus using a single wire secondary distribution.

2. Discussion of the Background Art

Currently the interface between a spacecraft bus and a plurality of payload units requires a separate power line, communication lines and telemetry lines for every payload unit on the spacecraft. The spacecraft bus is the main bus on the spacecraft that is connected to the spacecraft command processor. The spacecraft command processor is the main processor on a spacecraft that sends and receives data from the ground and also sends and receives data from the plurality of payload units on the spacecraft. The plurality of payload units are the electronic sub-systems such as receivers, power amplifiers, frequency converters and low noise amplifiers.

Prior designs include 8 or more wires connecting one payload unit to the spacecraft bus. Each payload unit on the spacecraft has a separate 8 wire connection to the spacecraft bus including 2 wires for power, 4 wires for commands, 2 wires for telemetry and return wires via the chassis. As the size of payload electronics shrinks, the size of the circuitry interfacing with the spacecraft bus must also shrink in order to properly operate. One current approach to reducing the size and weight of the interface circuitry to each payload unit is utilizing smaller components and higher density packaging technologies. Although this has resulted in very good incremental improvements, a new architecture for these interfaces is needed to make a step decrease in the size and weight of the payload units as each payload unit still requires at least an 8 wire interface.

Thus there is a need for an interface design between a spacecraft bus and the payload units which can solve the problems discussed above.

SUMMARY OF INVENTION

The present invention advantageously addresses the need above as well as other needs by providing an interface between the payload units and the spacecraft bus using a single wire secondary distribution.

In one embodiment, the present invention can be characterized as a method of transmitting data to a payload unit comprising the steps of sending a command from a command processor to a central bus interface unit for routing the command to the payload unit; providing power over a power line from a central power supply to the payload unit; interrupting the power to the payload unit to provide the payload unit with the command from the command processor.

In another embodiment, the invention can be characterized as a method of communicating with a payload unit comprising the steps of providing power to the payload unit over a wire; and providing telemetry from the payload unit over the wire to a spacecraft command processor.

In yet another embodiment, the invention can be characterized as a system comprising a spacecraft command processor; a central bus interface unit coupled to the command processor; a payload unit coupled to the central bus interface unit; and a centralized power supply for powering the central bus interface unit and the payload unit; wherein the spacecraft command processor provides a command to the central bus interface unit; wherein the central bus interface unit interrupts the power to the payload unit in a manner corresponding to the commands received by the central bus interface unit; wherein the payload unit decodes the interrupts of the power and executes the command from the spacecraft command processor.

In an additional embodiment the present invention can be characterized as a system for communicating with a payload unit comprising a command processor; and the payload unit coupled to the command processor through a combined power and communication wire; wherein the payload unit receives power and command data over the combined power and communication wire.

In a further embodiment, the present invention can be characterized as a system for connecting a spacecraft bus to a payload unit comprising an interface for directing a command from a spacecraft command processor; a central bus interface unit coupled to the interface, the central bus interface unit comprising a command decoder; a register coupled to the command decoder; and a switch coupled to the register; wherein the register operates the switch; wherein the switch interrupts an output voltage, the interruption of the output voltage corresponding to the command from the spacecraft command processor; a centralized power supply coupled to the central bus interface unit; and an end user interface coupled to the output voltage, the end user interface comprising a decoder coupled to the output voltage for decoding the interrupts; and a power voltage for powering the payload unit during the interrupts.

BRIEF DESCRIPTION OF DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Advantageously, the embodiments described herein below include an apparatus and method for dramatically reducing the size, weight and cost of the electronics needed to provide the interface between a payload unit and a spacecraft bus or platform with which it interfaces. The spacecraft platform provides power and commands to units on the spacecraft and processes telemetry signals.

Typical prior designs have at least 8 wires for each payload unit connected to the spacecraft bus: 2 wires for power, 4 wires for commands, 2 wires for telemetry and return wires via the chassis. The spacecraft platform interfaces with the ground station and provides all housekeeping functions for the payload which comprises a plurality of payload units. The payload units, e.g., receivers, frequency converters, power amplifiers, low noise amplifiers, send telemetry back to the spacecraft platform and ground station to allow assessment of the health and condition of the payload. In prior designs each payload unit is connected to the spacecraft bus through at least 8 wires.

Advantageously, the present invention reduces the number of wires from each payload unit to the spacecraft bus to 1 with an additional 10 to 12 wires connecting the spacecraft bus to a central bus interface unit. Thus, in the present embodiment, the spacecraft bus is connected to a central bus interface unit which is in turn connected to the plurality of payload unit through only 1 wire per payload unit. Thus, for a design with 20 payload units connected to the spacecraft bus, the total number of wires is reduced from 160 to 32, an 80% decrease.

Additionally, the present embodiment is much more reliable than the prior designs because the number of wires connecting the spacecraft bus to the payload units is greatly reduced. Each one of these wires has the possibility of failing or introducing errors into the system, thus the reduction in wires reduces the chances that there will be a failure. By decreasing the wires, e.g., by 80%, as described above, the present embodiment can also be assembled and tested in much less time than prior designs because there are less connections between the payload units and the spacecraft bus to test.

Figure 1:
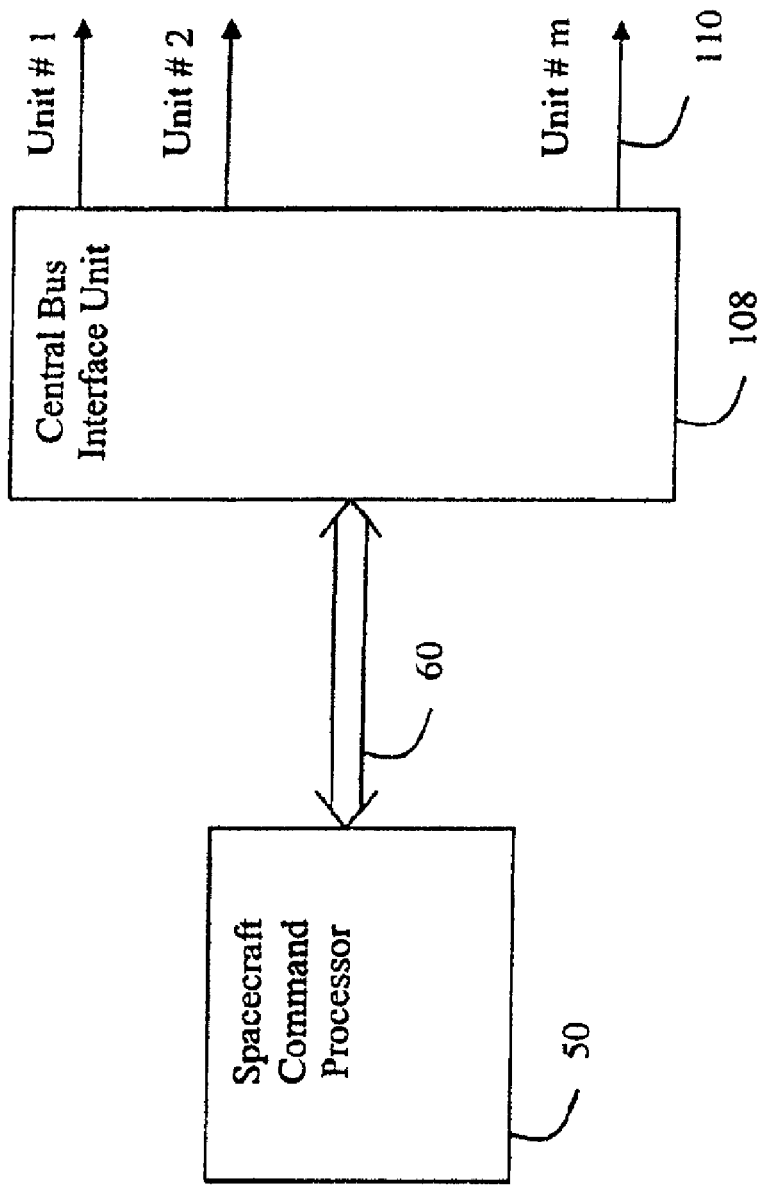
FIG. 1 is a block diagram illustrating an overview of the present invention.

Referring to FIG. 1 a block diagram is shown illustrating an overview of the present invention. Shown is a spacecraft platform 50, a spacecraft bus interface 60, a central bus interface unit 108, and a plurality of outputs 110 to a plurality of payload units.

The spacecraft platform 50 is connected via the spacecraft bus interface 60 to the central bus interface unit 108. The central bus interface unit has a plurality of outputs 110.

The plurality of outputs 110 are connected to a plurality of payload units. Each payload unit corresponds to one of the plurality of outputs 110. In accordance with the present invention the plurality of outputs 110 are all single wire distributions for providing both power and command data over a single wire.

Prior designs did not incorporate the central bus interface unit. The prior designs had each payload unit connected to the spacecraft bus with at least 8 wires, each of the wires used separately for power, command data and telemetry. Thus, the present invention greatly reduces the number of wires needed for the interface between a plurality of payload units and the spacecraft bus 60 by providing a single wire to each payload unit that is used for both power and command data.

Figure 2:
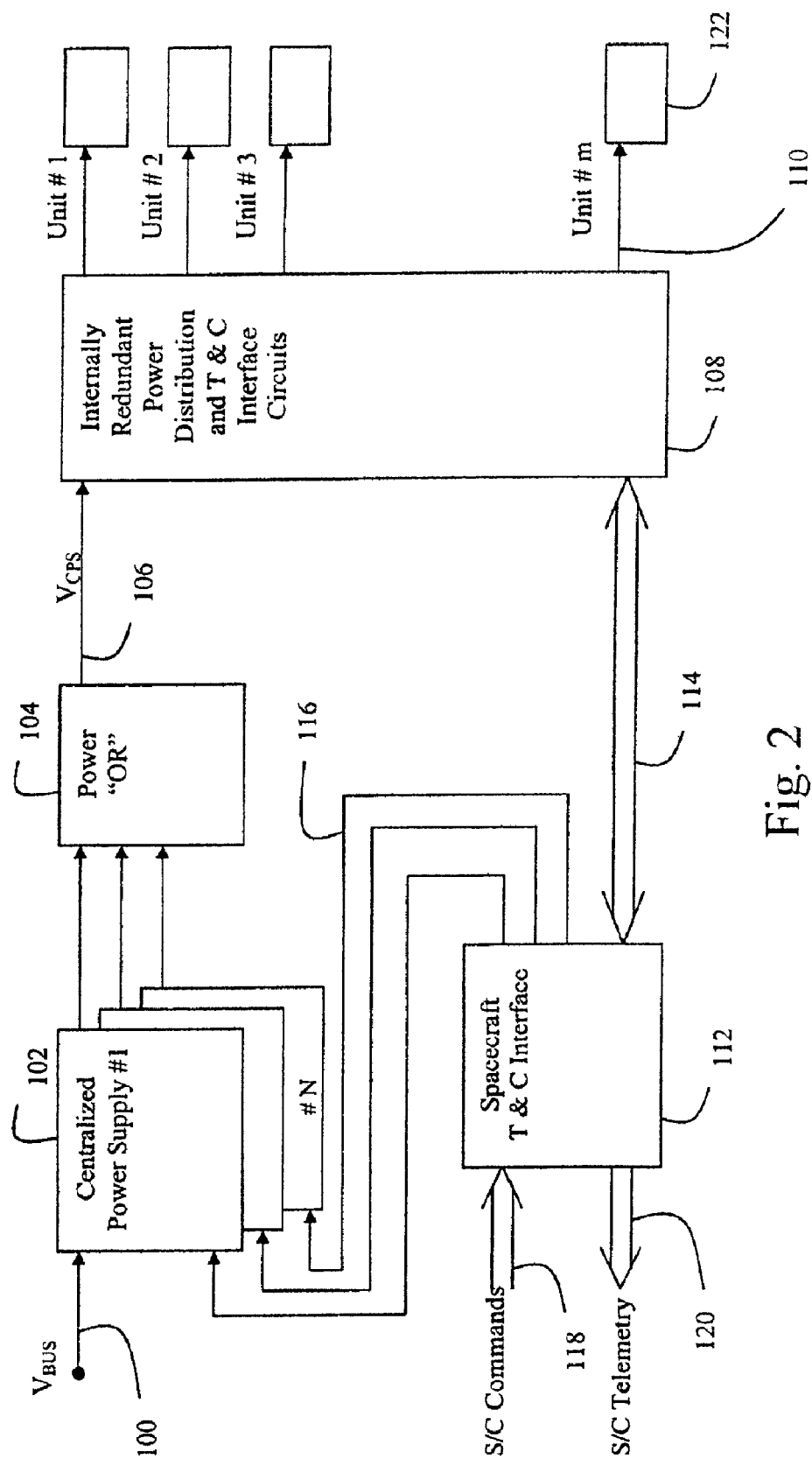
FIG. 2 is a block diagram illustrating a centralized bus interface unit with a single wire power, telemetry, and command distribution in accordance with the present invention.

Referring to FIG. 2 a block diagram is shown illustrating a centralized bus interface unit with a single wire power, telemetry, and command distribution in accordance with one embodiment of the present invention. Shown is a plurality of centralized power supplies 102, a power OR block 104, a central bus interface unit 108, a spacecraft interface 112, a main power supply 100, a central power supply line 106, a plurality of outputs 110, a command bus 118, a telemetry bus 120, an data bus 114, a plurality of power supply control lines 116, and a plurality of payload units 122.

The main power supply bus 100, command bus 118 and the telemetry bus 120 are all part of the spacecraft bus interface 60 which is connected to the spacecraft platform 50, shown in FIG. 1. The main power supply 100 is connected to the plurality of centralized power supplies 102. The command bus 118 and the telemetry bus 120 are connected to the spacecraft interface 112. The spacecraft interface 112 is connected to the plurality of centralized power supplies through a plurality of power supply control lines 116. The spacecraft interface 112 is also connected to the central bus interface unit 108 through the data bus 114.

The plurality of centralized power supplies 102 are connected to the power OR block 104 which is connected to the central bus interface unit 108 through the central power supply line 106. The central bus interface unit 108 is connected to the plurality of payload units 122 through the plurality of outputs 110.

As is shown by the overview in FIG. 1, the plurality of centralized power supplies 102, the power OR block 104, and the spacecraft interface 112 are all optional features of the present invention. The main power supply 100, the command bus 118 and the telemetry bus 120 can be connected directly to the central bus interface unit 108. In this embodiment some of the function of the spacecraft interface may be included in the central bus interface unit 108. The plurality of centralized power supplies 102, the power OF block 104, and the spacecraft interface are optional features, however, in a preferred embodiment they are included because they add redundancy and reliability as compared to having only one power supply. This is because if one of the plurality of centralized power supplies 102 fails, the power OR block 104 will still provide power to the central bus interface unit 108.

The main power supply bus 100 from the spacecraft platform is connected to the plurality of centralized power supplies 102. The plurality of centralized power supplies 102 are a plurality of power supply slices that are connected in parallel and provide redundancy if one or more of the plurality of centralized power supplies 102 fails. The outputs from the plurality of centralized power supplies 102 are connected to a power OR block 104. The power OR block 104, is a logic device that supplies a high output as long as one of the plurality of centralized power supplies is outputting power into the power OR block 104. The output from the power OR block 104 is the central power supply line 106. The central power supply line 106 provides power to the central bus interface unit 108. The central bus interface unit 108 is later described in more detail with reference to FIG. 3. In an alternative design, the main power supply 100 from the spacecraft bus can be directly connected to the central bus interface unit 108.

The spacecraft platform 50 provides commands through the command bus 118 which is part of the spacecraft bus interface 60. The commands are sent over the command bus 118 through the spacecraft interface 112. The commands are then directed either to the plurality of centralized power supplies 102 or to the central bus interface unit 108. In one embodiment, the commands include a command header, which contains information as to where the command is to be directed. Each of the plurality of centralized power supplies 102 and each of the plurality of payload units 122 has a unique command header associated with it. Thus, when the spacecraft platform 50 sends out a command, the spacecraft interface 112 will direct the command accordingly. The spacecraft interface 112 will decide, based upon the command header, if the command is for one of the plurality of centralized power supplies 102, e.g., an on/off command, or if the command is for one of the plurality of payload units 122.

If the command is for one of the plurality of centralized power supplies 102 the command will be sent to one of the plurality of centralized power supplies 102 through one of the plurality of power supply control lines 116. For example, the spacecraft platform 50 can individually turn on or off each of the plurality of centralized power supplies 102 by sending an on/off command over the command bus 118 to the spacecraft interface 112. The spacecraft interface 112 then sends the on/off command over one of the plurality of power supply control lines 116 to one of the plurality of centralized power supplies 102.

If, however, the command, including the command header, from the spacecraft platform 50 is for one of the plurality of payload units 122 the command will be directed from the spacecraft interface 112 to the central bus interface unit 108 through the data bus 114. The spacecraft interface 112 will direct the command to the central bus interface unit 108 based upon the command header. The central bus interface unit 108 interprets the command header and directs the command over one of the plurality of outputs 110 to one of the plurality of payload units 122.

The plurality of outputs 110 provide both power and data, i.e., the commands from the spacecraft platform 50, to a plurality of payload units 122. This will be described in greater detail herein with reference to FIGS. 3 and 4. The plurality of output 110 are each a single wire. Each payload unit 122 is provided with power and data over one of the plurality of outputs 110, thus, greatly reducing the number of wires required from the spacecraft bus to the plurality of payload units 122 as compared with the prior designs described above. Telemetry is also provided from the plurality of payload units 122 back to the central bus interface unit 108 and back to the spacecraft platform 50. This will be described in greater detail herein with reference to FIG. 3. In a typical application, the plurality of payload units 122 can range from about 20 payload units to 150 payload units, however, the number of payload units 122 does not limit the present invention, for example, in one variation only one payload unit is connected to the central bus interface unit 108.

Figure 3:
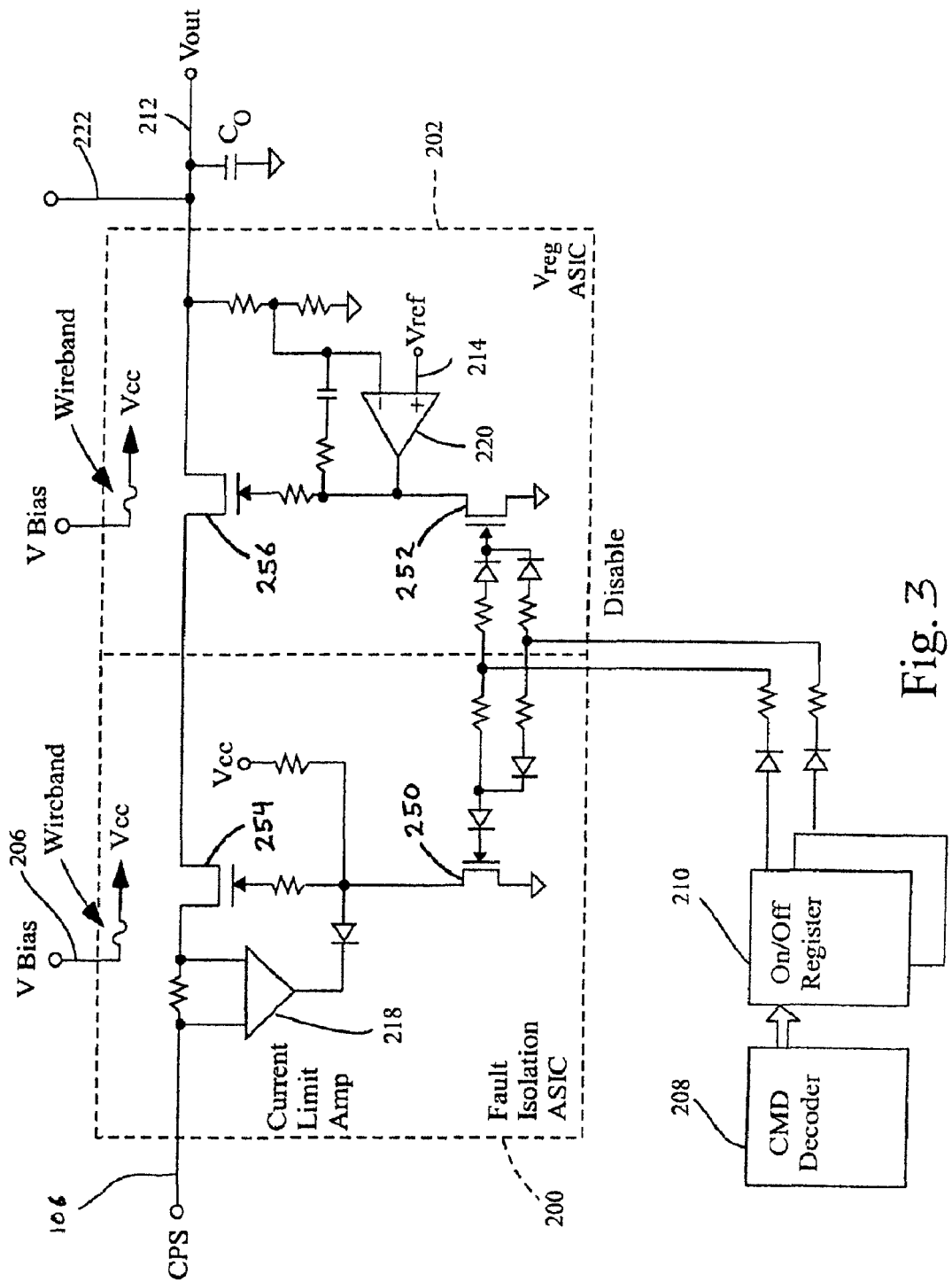
FIG. 3 is a schematic diagram illustrating an internally redundant power and command distribution circuitry in accordance with the embodiment shown in FIG. 2.

Referring to FIG. 3 a schematic diagram is shown illustrating one embodiment of the central bus interface unit 108 shown in FIG. 2. Shown is the central power supply line 106, a fault isolation circuit 200, a voltage regulation circuit 202, an output voltage 212, a decoder 208, a register 210, a bias voltage 206, a op amp 220, a reference voltage 214, a Vcc voltage 216, a first transistor 250, a second transistor 252, a third transistor 254, a fourth transistor 256, and a telemetry line 222.

The central power supply line 106 is the output from the power OR block 104 shown in FIG. 2. The central power supply line is connected to the drain of the third transistor 254. The third transistor 254 is part of to the fault isolation circuit 200. The source of the third transistor 254 is connected to the drain of the fourth transistor 256. The source of the fourth transistor 256 is the output voltage 212.

The command decoder 208 is connected to the register 210. The output of the register is coupled through an impedance to the gate of the first transistor 250 and to the gate of the second transistor 252. The drain of the first transistor 250 is coupled through an impedance to the gate of the third transistor 254. The drain of the second transistor 252 is coupled through an impedance to the gate of the fourth transistor 256. The sources of both the first transistor 250 and the second transistor 252 are connected to ground.

FIG. 3 represents part of the central bus interface unit 108 of FIG. 2. The central bus interface unit 108 generally includes more than one of the circuits shown in FIG. 2. Specifically, in one embodiment, the central bus interface unit 108 will include the circuitry shown in FIG. 2 for each payload unit 122 that is connected to the central bus interface unit 108. The payload unit 122 can be many types of circuits, including for example, a receiver, a power amplifier, a frequency converter, and a low noise amplifier. The present embodiment is not limited to particular types of payload units 122, but rather, as will be appreciated by one of ordinary skill in the art, many different types of payload units 122 may be used.

The decoder 208 receives commands from the spacecraft platform 50 over the data bus 114. The decoder 208 is connected to the register 210. The commands from spacecraft platform 50 are translated into short pulses by the decoder 208 and the register 210. When the register 210 outputs a high signal, the output voltage to the payload unit 122 is momentarily interrupted (e.g., for 10 mSec). This interruption is received by a decoder at the payload unit 122 and thus receives the commands from the spacecraft platform. The decoder is described in greater detail herein with reference to FIG. 3.

In operation, when, the register 210 outputs a high signal in order to momentarily interrupt the output voltage 212, this applies a high voltage to the gate of the first transistor 250 and the gate of the second transistor 252, thus turning on the first transistor 250 and the second transistor 252. This brings the bias voltage at the gate of the third transistor 254 and the fourth transistor 256 below the level needed to turn on the third transistor 254 and the fourth transistor 256. Thus, the third transistor 254 and the fourth transistor 256 turn off. This causes the momentary interruption of the output voltage 212 until the register 210 outputs a low signal. When the register outputs a low signal, the voltage at the gate of the third transistor 254 and the fourth transistor 256 returns to a high enough level to turn back on the third transistor 254 and the fourth transistor 256. This restores the output voltage 212. The biasing levels and operation of transistors is known to one of ordinary skill in the art.

Generally, the output voltage to the payload unit 122 will be interrupted multiple times for each command from the spacecraft command processor. As shown, the register 210 is redundant in case one of the registers fails the power will still be interrupted. Additionally, either of the fault isolation circuit 200 or the voltage regulation circuit 202 can interrupt the output voltage 212 such that the command is provided to the payload unit 122. The third transistor 254 and the fourth transistor 256 act as switches and are located inside the fault isolation circuit 200 and the voltage regulation circuit 202 respectively. The switches inside of the fault isolation circuit 200 and the voltage regulation circuit 202 are connected in series such that if one of the switches fails, the other switch will still be able to interrupt the output voltage 212.

In addition to transferring data sent by the spacecraft command processor 50, the circuitry shown in FIG. 3 also provides redundancy and short circuit current protection. Specifically, the fault isolation circuit 200 also senses the current to each payload unit 122 and disconnects if an over current fault condition is detected, thus isolating a short circuit in one payload unit 122 from affecting other payload units 122. The voltage regulation circuit also has the additional functionality of post regulation, providing each payload unit 122 with a cleaner additionally refined power form.

The telemetry line 222 is coupled to a demodulator circuit (not shown) in the central bus interface unit 108. The demodulator circuit then receives the telemetry data received from the payload unit 122 and sends it back to the spacecraft platform through the data bus 114 and interface circuit 112. The telemetry functions can be added to the decoder chip 350 of FIG. 4 or can be implemented on a separate ASIC at the payload unit 122. A variety of techniques can be used for transmitting telemetry data from the payload unit 122 back to the spacecraft command processor. One technique is to use a spread spectrum signal generated by the decoder chip 350 back to the demodulator (not shown) which can be added to either the fault isolation circuit 200 or the voltage regulation circuit 202. Notch filters can be used on the power line in each unit as well as in the central bus interface unit 108 to prevent the spread spectrum signal from propagating to undesirable locations through the various power lines. The single wire from the central bus interface unit 108 to each payload unit 122 is generally a shielded wire or coax cable to control radiated emissions and susceptibility to outside signals, however, any wire or transmission medium can be used in applications which do not require shielding. In an alternative form the telemetry data can be sent over a single frequency modulated carrier or any other of a variety of know transmission methods. Additionally, the same type of power interruption that is used to transmit the command data can be used in transmitting the telemetry data back to the central bus interface unit 108.

In an alternative embodiment, the telemetry data can be transmitted back to the central bus interface unit 108 using a separate return wire. Additionally, it more than one wire is used in between the central bus interface unit 108 and the payload unit 108 in accordance with the present invention, power can be supplied either on the line where telemetry data is being sent or on the same line the command data is being sent. Thus, in accordance with the present invention, power is supplied over the same line as either the command data or telemetry data or both.

The bias voltage 206 can be supplied directly from either a separate output of the power OR block 104 or from the central power supply line 106. Alternatively, the bias voltage 206 can be connected to the central power supply 106 through a diode and capacitor, thus providing a bias voltage 206 which is lower than the central power supply 106.

In another embodiment, both the commands and telemetry are transmitted on the power line using a spread spectrum signal. Each payload unit 122 and the central bus interface unit 108 can include a spread spectrum demodulator and modulator, respectively. In this embodiment, the power is not interrupted but the spread spectrum signal is sent to the payload unit 122 on the same line that power is being supplied to the payload unit 122. In this embodiment, the central bus interface unit 108 receives a command from the spacecraft platform 50. The central bus interface unit then sends the command to one of the payload units 122 using a spread spectrum signal. As described above, the command includes a command header which identifies which of the plurality of payload units 122 should receive the command. The central bus interface unit 108 includes a spread spectrum modulator which enable it to send out the signal to the desired payload unit 122. In this embodiment the payload unit 122 includes a spread spectrum demodulator so that it can receive the command. The payload unit 122 receives the command over the power line. Thus, the output power 212 from the central bus interface unit 108 is also a communication line, i.e., a combined power and communication line.

In an alternative embodiment, the commands can be transmitted about a 10 Mhz frequency modulated carrier and the telemetry data can be transmitted about a 15 Mhz frequency modulated carrier on the same line as the power to the payload unit 122. The central bus interface unit 108 includes a frequency modulator. The central bus interface unit 108 receives the commands from the spacecraft platform 50. The commands are then modulated and sent to the payload unit 122. The payload unit 122 includes a frequency demodulator, such that the commands being sent to the payload unit 122 oh the 10 Mhz frequency modulated carrier can be demodulated. This allows the payload unit to properly receive the commands from the spacecraft platform 50. In this embodiment, the power and data are still transmitted over the output power line 212.

Figure 4:
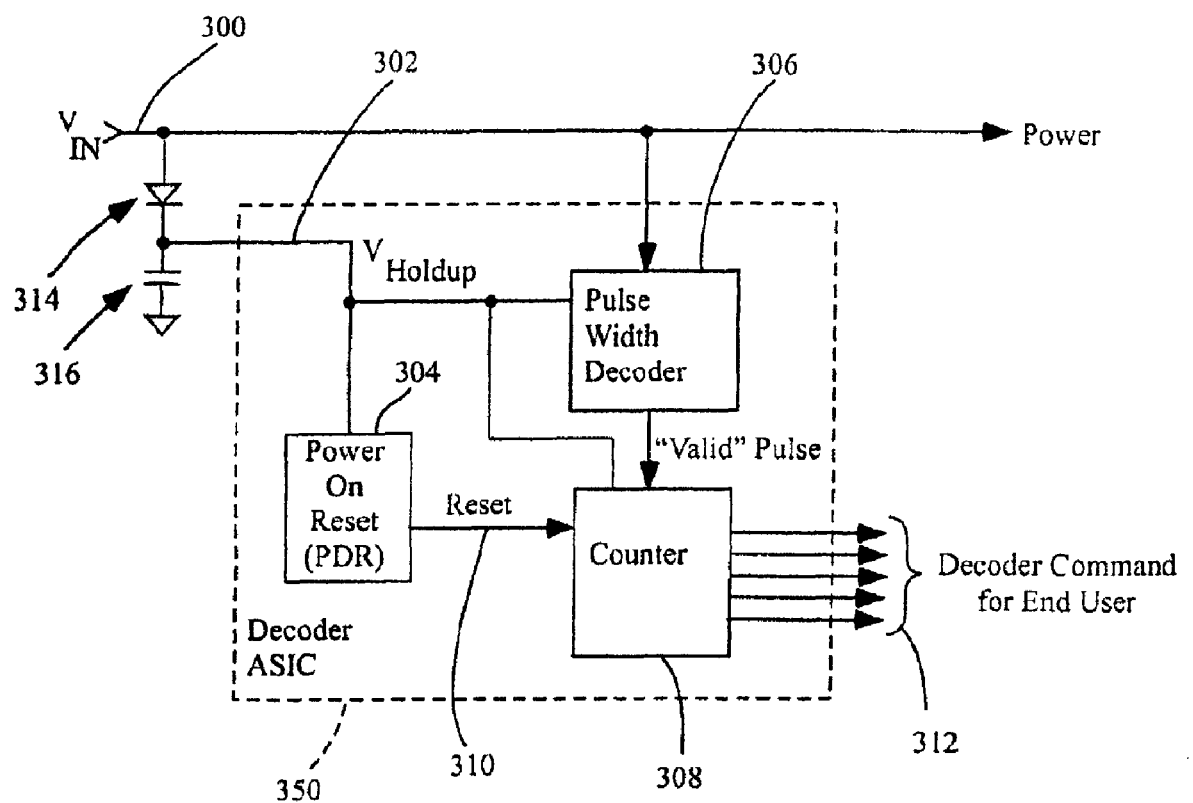
FIG. 4 is a schematic diagram illustrating an interface for powering a payload unit and decoding commands in accordance with the embodiment shown in FIG. 2.

Referring to FIG. 4 a schematic diagram is shown illustrating an interface for powering a payload unit and decoding commands in accordance with the embodiment shown in FIG. 2. Shown is a decoder chip 350, an input voltage 300, a power voltage 302, a power reset 304, a pulse width decoder 306, a counter 308, a reset line 310, an output 312, a diode 314 and a capacitor 316.

The input voltage 300 is connected to the diode 314. The diode is connected to a the capacitor 316 and the capacitor 316 is connected to ground. The node between the diode 314 and the capacitor is the power voltage 302. The power voltage 302 is connected to the pulse width decoder 306, the counter 308, and the power reset 304. The reset line 310 of the power reset 304 is connected to the counter 308. The input of the pulse width decoder 306 is connected to the input voltage 300 and the output of the pulse width decoder 306 is connected to the counter 308. The pulse width decoder 306, the power reset 304 and the counter 308 comprises one embodiment of the decoder chip 350.

The interface includes circuitry for powering the payload unit 122 and for decoding the commands sent by the central bus interface unit 108. As described above, in one preferred embodiment, the commands are sent by momentarily interrupting the output power 212.

In a preferred embodiment, each payload unit 122 will have the interface as shown in FIG. 4. This allows each payload unit 122 to be able to process commands from the spacecraft command processor. The output voltage 212 of FIG. 3 is connected to the input voltage 300 of FIG. 4. By interrupting the input voltage to the payload unit 122, commands are sent to each payload unit 122 over a single wire.

The power voltage 302 supplies the payload unit 122 with a constant voltage such that when the input voltage 300 is momentarily interrupted the payload unit will not turn off. The decoder 306 detects the momentary interruptions of the input voltage 300 and sends a valid pulse signal to the counter 308. The counter 308 sends an output 312 which corresponds to the original command sent by the spacecraft platform 50 to the payload unit 122. As described earlier, each command from the spacecraft platform will generally translate into a plurality of pulse signals or interruptions of the power to the payload unit 122. The payload unit 122 can then respond to the commands from the spacecraft platform.

The power reset 304 will reset the payload unit if the power to the payload unit is interrupted for a long enough period of time, e.g., a time longer than the interrupt time for a valid pulse. The power reset 304 sends a reset signal to the counter which is relayed to the payload unit 122 through the counter 308. This will reset the entire payload unit 122.

Alternative to the interface shown in FIG. 4, the interface can include either a spread spectrum demodulator or a frequency demodulator. In this embodiment, the modulator chosen corresponds to the type of signal being generated by the central bus interface unit 108. The output from either demodulator is provided to the payload unit 108.

The present invention has been described herein as being used for application on a spacecraft, however, the present invention can also be used in any application where the cost of wire is at a premium or where efficiency and reliability are desired, e.g., on an airplane.

The present invention as described herein includes many redundant circuit parts, e.g., the plurality of centralized power supplies 102. For application in a space environment, many redundancy features can be very important as repairing a part that has failed in space is either very costly or impossible. However, in accordance with the present invention, this redundancy is not required in all applications. This is because in some applications, repair is possible, or a very low cost design is necessary. Every time you add a redundancy it will add cost to the apparatus.

For example, one type of redundancy that is not required in some embodiments is the plurality of centralized power supplies 102. In this embodiment, the central bus interface unit is powered directly from the main power supply line 100 of the spacecraft bus 60. Another example of this redundancy is having both the fault isolation circuit 200 and the voltage regulation circuit 202 being able to interrupt the central supply voltage 204. If either the fault isolation circuit 200 or the voltage regulation circuit 202 fails, the power to the payload unit 122 will still be interrupted. In contrast, in another embodiment, only one of the fault isolation circuit 200 and the voltage regulation circuit 202 is able to interrupt the power to the payload unit 122 when sending a command to the payload unit 122.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

I claim:

1. A method of transmitting data on an aircraft or spacecraft comprising the steps of:
   sending a command from an aircraft or spacecraft platform command processor to an aircraft or spacecraft central bus interface unit comprising a register and a switch;
   providing power over a single power line to an aircraft or spacecraft payload unit; and
   interrupting the power provided to the aircraft or spacecraft payload unit over the single power line by turning the switch on and off with the register, based on the command, to provide the aircraft or spacecraft payload unit with the command from the aircraft or spacecraft platform command processor with the aircraft or spacecraft payload unit determining the command based on measurements of the power interruption, wherein power interruptions having different measurements correspond to different commands.

2. The method of claim 1 further comprising sending telemetry from the aircraft or spacecraft payload unit to the aircraft or spacecraft platform command processor.

3. The method of claim 2 wherein the telemetry is sent over the single power line.

4. The method of claim 1 further comprising the steps of:
   providing the power over another single power line to an aircraft or spacecraft second payload unit; and
   interrupting the power provided to the aircraft or spacecraft second payload unit over the another single power line to provide the aircraft or spacecraft second payload unit with a second command from the aircraft or spacecraft platform command processor with the aircraft or spacecraft second payload unit determining the second command based on measurements of the power interruption to the aircraft or spacecraft second payload unit.

5. The method of claim 1 wherein the power provided over the single power line to the aircraft or spacecraft payload unit is provided from an aircraft or spacecraft central power supply.

6. The method of claim 1 wherein the aircraft or spacecraft payload unit determines the command using a decoder which processes the command.

7. The method of claim 1 wherein the aircraft or spacecraft central bus interface unit comprises a plurality of registers and a plurality of switches connected in series, wherein the interrupting the power provided to the aircraft or spacecraft payload unit over the single power line comprises turning at least one of the switches on and off with at least one of the registers based on the command.

8. The method of claim 1 wherein the register is coupled to a command decoder, and further comprising the command decoder receiving the command from the aircraft or spacecraft platform command processor, decoding the command, and the register turning the switch on and off based on the decoded command.

9. The method of claim 1 wherein the interrupting the power provided to the aircraft or spacecraft payload unit over the single power line comprises the aircraft or spacecraft central bus interface unit interrupting the power over the single power line.

10. The method of claim 3 further comprising a modulator sending the telemetry over the single power line from the aircraft or spacecraft payload unit to the aircraft or spacecraft platform command processor.

11. The method of claim 10 further comprising a demodulator at the aircraft or spacecraft central bus interface unit receiving the telemetry.

12. The method of claim 11 further comprising output voltage being sent over the single power line.

13. The method of claim 11 wherein the modulator sending the telemetry over the single power line uses a spread spectrum signal.

14. The method of claim 1 wherein the measurements of the power interruption comprise the number of times the power provided to the aircraft or spacecraft payload unit is interrupted.

15. The method of claim 14 wherein different numbers of times the power provided to the aircraft or spacecraft payload unit is interrupted correspond to different commands.

16. The method of claim 1 wherein the measurements of the power interruption comprise a length of a period of time the power provided to the aircraft or spacecraft payload unit is interrupted.

17. The method of claim 16 wherein different lengths of the period of time the power provided to the aircraft or spacecraft payload unit is interrupted correspond to different commands.

18. The method of claim 1 wherein the measurements of the power interruption comprise at least one of the number of times the power provided to the aircraft or spacecraft payload unit is interrupted, or a length of a period of time the power provided to the aircraft or spacecraft payload unit is interrupted.

19. The method of claim 18 wherein at least one of different numbers of times the power provided to the aircraft or spacecraft payload unit is interrupted or different lengths of the period of time the power to the aircraft or spacecraft payload unit is interrupted correspond to different commands.

20. The method of claim 8 wherein the register interrupts the power over the single power line by outputting a first signal and the register resumes the power over the single power line by outputting a second signal.

21. The method of claim 20 wherein the first signal comprises a high signal and the second signal comprises a low signal.

* * * * *